United States Patent
Laycock et al.

(10) Patent No.: US 9,612,587 B2
(45) Date of Patent: Apr. 4, 2017

(54) MOBILE EXTENSION FOR INDUSTRIAL OPERATOR CONSOLES

(71) Applicant: Honeywell International Inc., Morristown, NJ (US)

(72) Inventors: Graeme Laycock, Hunters Hill (AU); Rohan McAdam, Yetholme (AU)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 391 days.

(21) Appl. No.: 14/178,168

(22) Filed: Feb. 11, 2014

(65) Prior Publication Data

US 2015/0227123 A1    Aug. 13, 2015

(51) Int. Cl.
  *G05B 15/02*    (2006.01)
  *G06F 17/30*    (2006.01)
  *G06F 3/0484*    (2013.01)

(52) U.S. Cl.
  CPC ............ *G05B 15/02* (2013.01); *G06F 3/0484* (2013.01); *G06F 3/04842* (2013.01); *G06F 17/3087* (2013.01)

(58) Field of Classification Search
  None
  See application file for complete search history.

(56) References Cited

U.S. PATENT DOCUMENTS

| | | |
|---|---|---|
| 5,027,288 A | 6/1991 | Suzuki et al. |
| 5,361,336 A | 11/1994 | Atchison |
| 5,499,188 A | 3/1996 | Kline, Jr. et al. |
| 5,960,441 A | 9/1999 | Bland et al. |
| 6,259,958 B1 | 7/2001 | Steinman et al. |
| 6,279,101 B1 | 8/2001 | Witt et al. |
| 6,317,638 B1 | 11/2001 | Schreder et al. |

(Continued)

FOREIGN PATENT DOCUMENTS

| | | |
|---|---|---|
| DE | 4206076 | 9/1993 |
| DE | 10314721 A1 | 11/2004 |

(Continued)

OTHER PUBLICATIONS

Office Action dated Jul. 7, 2014 in connection with U.S. Appl. No. 13/174,241; 18 pp.

(Continued)

*Primary Examiner* — Eric C Wai

(57) ABSTRACT

A system includes an operator console having at least one graphical display configured to present information associated with an industrial process and with a control system associated with the industrial process. The system also includes a mobile extension associated with the operator console. The mobile extension is configured to present first process-related information to an operator and receive second process-related information from the operator for the control system. The operator console is configured to provide state information to the mobile extension, where the state information is associated with operations of the operator console. The mobile extension could be configured to base at least part of the first process-related information or at least part of the second process-related information on a location of the apparatus. The operator console could be configured to provide an indication that the mobile extension is currently in use by the operator.

20 Claims, 6 Drawing Sheets

(56) References Cited

U.S. PATENT DOCUMENTS

| | | |
|---|---|---|
| 6,437,692 B1 | 8/2002 | Petite et al. |
| 6,463,290 B1 | 10/2002 | Stilp et al. |
| 6,601,219 B2 | 7/2003 | Miura et al. |
| 6,782,264 B2 | 8/2004 | Anderson |
| 6,847,316 B1 | 1/2005 | Keller |
| 7,020,876 B1 | 3/2006 | Deitz et al. |
| 7,027,493 B2 | 4/2006 | Richards |
| 7,027,954 B2 | 4/2006 | Mets et al. |
| 7,054,695 B2 | 5/2006 | Opheim et al. |
| 7,090,683 B2 | 8/2006 | Brock et al. |
| 7,167,713 B2 | 1/2007 | Anderson |
| 7,171,673 B1 | 1/2007 | Steinman et al. |
| 7,209,727 B2 | 4/2007 | Castaneda et al. |
| 7,214,230 B2 | 5/2007 | Brock et al. |
| 7,228,527 B1 | 6/2007 | Phillips et al. |
| 7,369,913 B2 | 5/2008 | Heminway et al. |
| 7,371,210 B2 | 5/2008 | Brock et al. |
| 7,546,125 B2 | 6/2009 | Sharma et al. |
| 7,567,785 B2 | 7/2009 | Tsai et al. |
| 7,570,922 B2 | 8/2009 | Williams |
| 7,630,777 B2 | 12/2009 | Rudnick et al. |
| 7,634,322 B2 | 12/2009 | Samudrala et al. |
| 7,654,957 B2 | 2/2010 | Abreu |
| 7,656,271 B2 | 2/2010 | Ehrman et al. |
| 7,688,820 B2 | 3/2010 | Forte et al. |
| 7,701,913 B2 | 4/2010 | Chen et al. |
| 7,760,905 B2 | 7/2010 | Rhoads et al. |
| 7,819,859 B2 | 10/2010 | Prisco et al. |
| 7,876,722 B2 | 1/2011 | Hodson et al. |
| 7,978,062 B2 | 7/2011 | LaLonde et al. |
| 8,521,312 B2 | 8/2013 | Dongare |
| 2001/0038451 A1 | 11/2001 | Jung et al. |
| 2001/0038453 A1 | 11/2001 | Jung et al. |
| 2002/0120671 A1 | 8/2002 | Daffner et al. |
| 2002/0122230 A1 | 9/2002 | Izadpanah et al. |
| 2004/0010703 A1 | 1/2004 | Kouznetsov et al. |
| 2004/0021679 A1 | 2/2004 | Chapman et al. |
| 2004/0025042 A1 | 2/2004 | Kouznetsov et al. |
| 2004/0133689 A1 | 7/2004 | Vasisht |
| 2004/0230899 A1 | 11/2004 | Pagnano et al. |
| 2004/0259533 A1 | 12/2004 | Nixon et al. |
| 2005/0024181 A1* | 2/2005 | Hofbeck ............ B60R 25/02 340/5.7 |
| 2005/0039162 A1 | 2/2005 | Cifra |
| 2005/0049722 A1 | 3/2005 | Kobayashi |
| 2005/0059379 A1 | 3/2005 | Sovio et al. |
| 2005/0141553 A1 | 6/2005 | Kim et al. |
| 2005/0164684 A1 | 7/2005 | Chen et al. |
| 2005/0228509 A1 | 10/2005 | James |
| 2006/0238159 A1 | 10/2006 | Jung |
| 2006/0276143 A1 | 12/2006 | Anglin, Jr. |
| 2007/0073861 A1 | 3/2007 | Amanuddin et al. |
| 2007/0077665 A1 | 4/2007 | Bump et al. |
| 2007/0079250 A1 | 4/2007 | Bump et al. |
| 2007/0103324 A1 | 5/2007 | Kosuge et al. |
| 2007/0126576 A1 | 6/2007 | Script et al. |
| 2007/0132779 A1 | 6/2007 | Gilbert et al. |
| 2007/0153677 A1 | 7/2007 | McLaughlin et al. |
| 2007/0192498 A1 | 8/2007 | Dini et al. |
| 2008/0065243 A1 | 3/2008 | Fallman et al. |
| 2008/0094631 A1 | 4/2008 | Jung et al. |
| 2008/0109808 A1 | 5/2008 | Wing et al. |
| 2008/0155064 A1 | 6/2008 | Kosuge et al. |
| 2008/0222734 A1 | 9/2008 | Redlich et al. |
| 2009/0064295 A1 | 3/2009 | Budampati et al. |
| 2009/0073423 A1 | 3/2009 | Jung et al. |
| 2009/0271726 A1 | 10/2009 | Gavimath et al. |
| 2012/0004743 A1 | 1/2012 | Anne et al. |
| 2013/0006399 A1 | 1/2013 | Tandon et al. |
| 2013/0024685 A1 | 1/2013 | Kolavennu et al. |
| 2013/0332882 A1 | 12/2013 | Laycock et al. |
| 2014/0025339 A1 | 1/2014 | McAdam et al. |
| 2014/0121812 A1 | 5/2014 | Rudnick et al. |

FOREIGN PATENT DOCUMENTS

| | | |
|---|---|---|
| EP | 0962845 A2 | 12/1999 |
| EP | 1401171 A2 | 3/2004 |
| GB | 2427329 A | 12/2006 |
| WO | WO 01-35190 A2 | 5/2001 |
| WO | WO 03-079616 A1 | 9/2003 |
| WO | WO 2004-047385 A2 | 6/2004 |
| WO | WO 2006-017994 A1 | 2/2006 |
| WO | WO 2006-053041 A1 | 5/2006 |

OTHER PUBLICATIONS

Office Action dated Feb. 28, 2014 in connection with U.S. Appl. No. 13/174,241; 24 pp.
Office Action dated Mar. 20, 2013 in connection with U.S. Appl. No. 12/435,990; 16 pp.
Office Action dated Dec. 7, 2012 in connection with U.S. Appl. No. 12/435,990; 17 pp.
Office Action dated Sep. 7, 2012 in connection with U.S. Appl. No. 12/435,990; 15 pp.
Office Action dated May 14, 2012 in connection with U.S. Appl. No. 12/435,990; 15 pp.
Office Action dated Dec. 23, 2011 in connection with U.S. Appl. No. 12/435,990; 3 pp.
Office Action dated Oct. 28, 2011 in connection with U.S. Appl. No. 12/435,990; 14 pp.
Office Action dated Aug. 12, 2011 in connection with U.S. Appl. No. 12/435,990; 13 pp.
International Search Report dated Jan. 7, 2013 in connection with International Application No. PCT/US2012/043660; 3 pp.
Written Opinion dated Jan. 7, 2013 in connection with International Application No. PCT/US2012/043660; 3 pp.
International Search Report dated Apr. 15, 2008 in connection with International Application No. PCT/US2007/069705; 4 pp.
Written Opinion dated Apr. 15, 2008 in connection with International Application No. PCT/US2007/069705; 5 pp.
International Search Report dated Dec. 12, 2007 in connection with International Application No. PCT/US2007/015376; 5 pp.
Written Opinion dated Dec. 12, 2007 in connection with International Application No. PCT/US2007/015376; 6 pp.
International Search Report dated Dec. 10, 2007 in connection with International Application No. PCT/US2007/069717; 5 pp.
Written Opinion dated Dec. 10, 2007 in connection with International Application No. PCT/US2007/069717; 5 pp.
International Search Report dated Nov. 27, 2007 in connection with International Application No. PCT/US2007/069710; 4 pp.
Written Opinion dated Nov. 27, 2007 in connection with International Application No. PCT/US2007/069710; 6 pp.
International Search Report dated Nov. 22, 2007 in connection with International Application No. PCT/US2007/069614; 4 pp.
Written Opinion dated Nov. 22, 2007 in connection with International Application No. PCT/US2007/069614; 5 pp.
"UDC3500 Universal Digital Controller"; Honeywell; Mar. 2007; 16 pp.
Folkert Dokter; "Control of Batch Porcesses With Changing Recipes"; Automatisierungstechnische Praxis 33(1991)1; 6 pp.
"Infrared Thermostat Interface Module Simplifies T7350 Thermostat Programming"; automatedbuildings.com; Mar. 2006; 2 pp.
Aiello, et al.; "Wireless Distributed Measurement System by Using Mobile Devices"; IEEE Workshop; Sep. 5-7, 2005; 4 pp.
"Batch Automation and Optimization Experience"; Coherent Technologies, Inc.; at least as early as Jan. 17, 2008.
"Batch Control Part 1: Models and Terminology (Draft 12)"; ISA-dS88.01; ISA; 1994; 132 pp.
Benz; "Industrial Wireless: Implementation Success Factors"; Control Engineering Asia; Apr. 2009; 12 pp.
Pereira; "Developing an Instrumentation Network to Study and Analyze Communication Systems"; IEEE Instrumenation & Measurement Magazine; Mar. 2004; 8 pp.
Janicke, et al.; "Computer Supported Systems for Recipe Driven Batch Production"; ATP Automatisierungstechnische Praxis; 36 Oct. 1994, No. 10; 8 pp.

(56) References Cited

OTHER PUBLICATIONS

Kersting, et al.; "Recipe Control of Chemical Batch Processes: Examples for Using the NAMUR Recommendation NE 33"; ATP; 37 Feb. 1995, No. 2; 9 pp.

Muller-Heinzerling, et al.; "Recipe Controlled Operation of Batch Processes with Batch X"; ATP Automatisierungstechnische Praxis; 36 Mar. 1994, No. 3; 9 pp.

Kersting, et al.; "Requirements to be Met by Systems for Recipe-Based Operations"; NAMUR-Geschaftsstelle; Jan. 17, 2003; 32 pp.

Pfeffer, et al.; "Automatisierung von Chargenprozessen mit Weschselnden Rezenpturen in CONTRONIC P"; ATP Automatisierungstechnische Praxis; Aug. 31, 1989, No. 8; 7 pp.

"Rockwell Automation Process Industry Strategies"; ARC Advisory Group; Oct. 2006; 38 pp.

"RSBizWare BatchCampaign—User's Guide"; Rockwell Automation; Aug. 2007; 71 pp.

"RSBizWare Batch Process Management for Batch Manufacturing—PhaseManager User's Guide"; Rockwell Automation; Jul. 2005; 143 pp.

"TotalPlant Batch Specification and Technical Data"; Honeywell; Release 3.0; TB22300A; Apr. 29, 2002; 59 pp.

"TotalPlant Batch Technical Reference—Release 2.1"; Honeywell; TB29210A; May 26, 2000; pp. 1-158.

"TotalPlant Batch Technical Reference—Release 2.1"; Honeywell; TB29210A; May 26, 2000; pp. 159-322.

"TotalPlant Batch Technical Reference—Release 2.1"; Honeywell; TB29210A; May 26, 2000; pp. 323-435.

"TotalPlant Batch Technical Reference—Release 8.0"; Honeywell; TB29-800A; Jul. 20, 2007; pp. 1-173.

"TotalPlant Batch Technical Reference—Release 8.0"; Honeywell; TB29-800A; Jul. 20, 2007; pp. 174-378.

"TotalPlant Batch Technical Reference—Release 8.0"; Honeywell; TB29-800A; Jul. 20, 2007; pp. 379-508.

"TotalPlant Batch User Guide—Release 2.1"; Honeywell; TB28210A; May 26, 2000; pp. 1-165.

"TotalPlant Batch User Guide—Release 2.1"; Honeywell; TB28210A; May 26, 2000; pp. 166-318.

"TotalPlant Batch User Guide—Release 2.1"; Honeywell; TB28210A; May 26, 2000; pp. 319-449.

"TotalPlant Batch User Guide—Release 8.0"; Honeywell; TB28-800A; Jul. 20, 2007; pp. 1-204.

"TotalPlant Batch User Guide—Release 8.0"; Honeywell; TB28-800A; Jul. 20, 2007; pp. 205-401.

"TotalPlant Batch User Guide—Release 8.0"; Honeywell; TB28-800A; Jul. 20, 2007; pp. 402-565.

"TotalPlant Batch User Guide—Release 8.0"; Honeywell; TB28-800A; Jul. 20, 2007; pp. 566-644.

International Search Report and Written Opinion dated May 8, 2015 in connection with International Patent Application No. PCT/US2015/013458, 12 pages.

* cited by examiner

MOBILE EXTENSION FOR INDUSTRIAL OPERATOR CONSOLES

TECHNICAL FIELD

This disclosure relates generally to industrial control and automation systems. More specifically, this disclosure relates to a mobile extension for industrial operator consoles.

BACKGROUND

Industrial process control and automation systems are often used to automate large and complex industrial processes. These types of control and automation systems routinely include sensors, actuators, and controllers. The controllers typically receive measurements from the sensors and generate control signals for the actuators.

These types of control and automation systems also typically include numerous operator consoles. Operator consoles are often used to receive inputs from operators, such as setpoints for process variables in an industrial process being controlled. Operator consoles are also often used to provide outputs to operators, such as to display warnings, alarms, or other information associated with the industrial process being controlled. Large collections of operator consoles are often used in control rooms where a number of operators assemble and work.

SUMMARY

This disclosure provides a mobile extension for industrial operator consoles.

In a first embodiment, a method includes presenting first process-related information to an operator at a mobile extension. The mobile extension is associated with an operator console that displays information associated with an industrial process and with a control system associated with the industrial process. The method also includes receiving second process-related information from the operator at the mobile extension for the control system. The method further includes receiving state information from the operator console at the mobile extension, where the state information is associated with operations of the operator console.

In a second embodiment, an apparatus includes a display configured to present first process-related information to an operator. The apparatus is associated with an operator console that is configured to display information associated with an industrial process and with a control system associated with the industrial process. The apparatus also includes at least one processing device configured to control presentation of the first process-related information on the display and to receive second process-related information from the operator for the control system. The at least one processing device is further configured to receive state information from the operator console, where the state information is associated with operations of the operator console.

In a third embodiment, a system includes an operator console having at least one graphical display configured to present information associated with an industrial process and with a control system associated with the industrial process. The system also includes a mobile extension associated with the operator console. The mobile extension is configured to present first process-related information to an operator and receive second process-related information from the operator for the control system. The operator console is configured to provide state information to the mobile extension, where the state information is associated with operations of the operator console.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
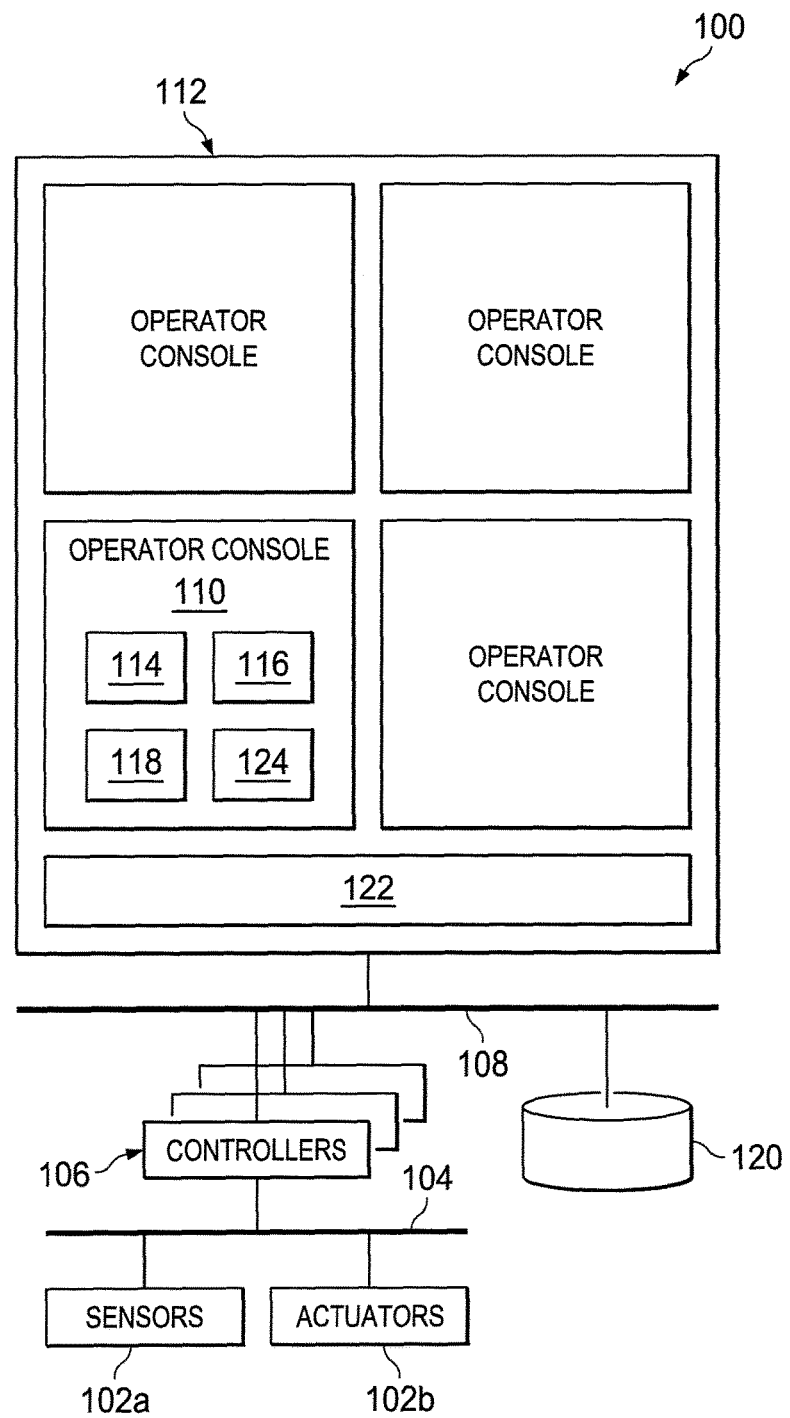
FIG. 1 illustrates an example industrial control and automation system according to this disclosure.

FIG. 1 illustrates an example industrial control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

Various controllers 106 are coupled directly or indirectly to the network 104. The controllers 106 can be used in the system 100 to perform various functions. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent multivariable controllers, such as Robust Multivariable Predictive Control Technology (RMPCT) controllers or other type of controllers implementing model predictive control (MPC) or other advanced predictive control (APC).

Access to and interaction with the controllers 106 and other components of the system 100 can occur via various operator consoles 110. As described above, each operator console 110 could be used to provide information to an operator and receive information from an operator. For example, each operator console 110 could provide information identifying a current state of an industrial process to the operator, including warnings, alarms, or other states associated with the industrial process. Each operator console 110 could also receive information affecting how the industrial process is controlled, such as by receiving setpoints for process variables controlled by the controllers 106 or by receiving other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more microprocessors, microcontrollers, digital signal processors, application specific integrated circuits, field programmable gate arrays, or discrete logic. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

In addition, the system 100 includes one or more databases 120. Each database 120 can be used to store any suitable information related to an industrial process or a control system used to control the industrial process. For example, as described in more detail below, one or more databases 120 can be used to store distributed control system (DCS) information and information associated with mobile devices used in the system 100. Each database 120 represents any suitable structure for storing and retrieving information.

Operator consoles 110 often represent the primary work environment for operators charged with the safe and efficient operation of modern industrial complexes. While operators typically spend most of their workday (such as 12-hour shifts) at operator consoles, there are often occasions when operators need to leave their consoles. This includes times when operators take breaks, eat, or collaborate with other operators, such as at other operators' consoles or in adjoining or nearby rooms.

Various factors make it increasingly difficult for operators to step away from their consoles. One factor is that operators need to maintain a high level of situational awareness in order for the operators to be able to identify and respond to abnormal process conditions that require their intervention. Another factor is that operators are being asked to take on responsibilities for larger areas of a process system, which increases their routine workload at their consoles.

In effect, operators can become "chained" to their operator consoles, unable to leave their consoles for any length of time. This has a negative impact on an operator's health, well-being, and productivity. While an operator console is a specialized Human Machine Interface (HMI) optimized for process monitoring and control, operators should be able to step away from their consoles for short periods of time while maintaining some degree of situational awareness and while maintaining the ability to perform routine process interventions. This would allow operators to take breaks and collaborate with others while still fulfilling their primary responsibilities.

In accordance with this disclosure, the system 100 includes one or more mobile extensions 122 that are associated with one or more operator consoles 110. Each mobile extension 122 represents a mobile device that can be used by an operator to interact with an associated operator console 110. For example, a mobile extension 122 can provide a user interface that provides access to information used by an operator to maintain situational awareness, such as alarm lists and process parameter trends. A mobile extension 122 also provides a mechanism for an operator to intervene in an industrial process, such as by acknowledging alarms and changing process parameters. In addition, a mobile extension 122 can be moved away from its associated operator console 110, thus allowing an operator to perform various functions when away from the operator console 110.

In some embodiments, each mobile extension 122 could have one, some, or all of the following three features. First, a mobile extension 122 can share state information with its associated operator console 110. State information is generally associated with operations of the operator console 110. Any suitable state information can be shared, such as the current operator's login credentials, the current operator's scope of responsibility, and the operator console's current view state. Ideally, this allows the mobile extension 122 to act as if it is part of the operator console 110 so that there are no initialization steps or other preparatory steps required to use the mobile extension 122 when moving away from the console 110. This allows an operator to move away from his or her operator console 110 and use the mobile extension 122 without having to go through the process of signing on and navigating to the information the operator was viewing before moving away from the console 110.

Second, when an operator is away from his or her operator console 110 and using the associated mobile extension 122, the operator console 122 can provide a visual indication that it is currently being used by a mobile operator. The operator console 110 could also provide limited functionality to anyone at the operator console 110. This could be done in order to avoid interfering with the mobile operator's control.

Third, the functionality of a mobile extension 122 can be "geofenced" so that the functionality provided by the mobile extension 122 is based at least partially on the physical location of the mobile extension 122. For example, if the mobile extension 122 is located within the same control room 112 as its associated operator console 110, the mobile extension 122 may provide the ability to view and acknowledge alarms and provide read/write access to process parameters. In a room adjoining the control room 112, the mobile extension 122 may provide the ability to acknowledge alarms and provide read-only access to process parameters. Outside the immediate vicinity of the control room 112, the mobile extension 122 may provide view-only access for alarms and read-only access to process parameters. Note, however, that the functions available in various locations can be different from those described above or configurable, or geofencing may not be used at all. Also note that the restrictions on what operations are available at the mobile extension 122 could be enforced at the mobile extension 122 or at the operator console 110.

The geofencing functionality could be supported in any suitable manner. For example, an operator console 110 could include one or more transceivers 124 used to communicate with its mobile extension 122. The transceiver(s) 124 could support the use of beacon signals, time of flight calculations, or other techniques for identifying an approximate distance between the mobile extension 122 and the operator console 110. Any suitable transceiver(s) 124 could be used to communicate with a mobile extension 122, such as a low-power BLUETOOTH 4 or WIFI transceiver. As another example, the mobile extension 122 could identify its location, such as by using the receipt of beacon signals, BLUETOOTH signals, or other signals (or the lack thereof) or by using time of flight or other calculations. The mobile extension 122 could then provide its location to the operator console 110.

The use of mobile extensions 122 in conjunction with operator consoles 110 can have various advantages depending on the implementation. For example, the mobile extensions 122 allow operators to move away from their operator consoles 110 while still maintaining some form of situational awareness. Also, the sharing of state information allows operators to quickly and easily use the mobile extensions 122 when needed. In addition, geofencing of the mobile extensions 122 can help to limit what operations can be completed away from the operator consoles 110. This can help to avoid situations where changes are made to an industrial control system by an operator who is not at an operator console 110 and who may lack a full view of an industrial process being controlled.

Additional details regarding the use of mobile extensions 122 with operator consoles 110 are provided below. Each mobile extension 122 includes any suitable structure that is portable and that supports interaction with an operator console. In some embodiments, a mobile extension 122 is implemented using a smartphone, tablet computer, or wearable computing device.

Although FIG. 1 illustrates one example of an industrial control and automation system 100, various changes may be made to FIG. 1. For example, industrial control and automation systems come in a wide variety of configurations. The system 100 shown in FIG. 1 is meant to illustrate one example operational environment in which mobile extensions can be incorporated into or used with operator consoles. FIG. 1 does not limit this disclosure to any particular configuration or operational environment.

Figure 2:
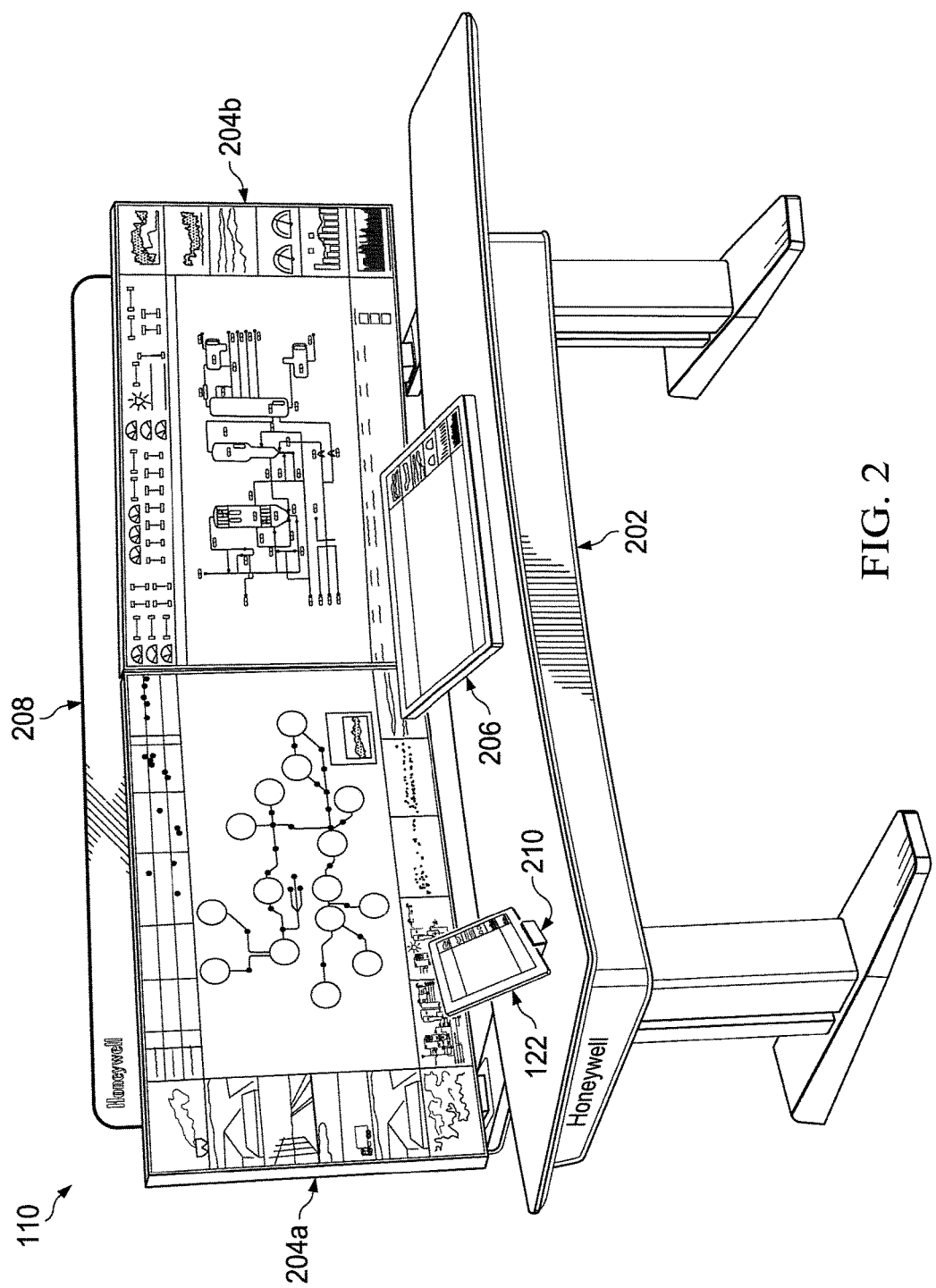
FIGS. 2 and 3 illustrate an example operator console with a mobile extension according to this disclosure.
Figure 3:
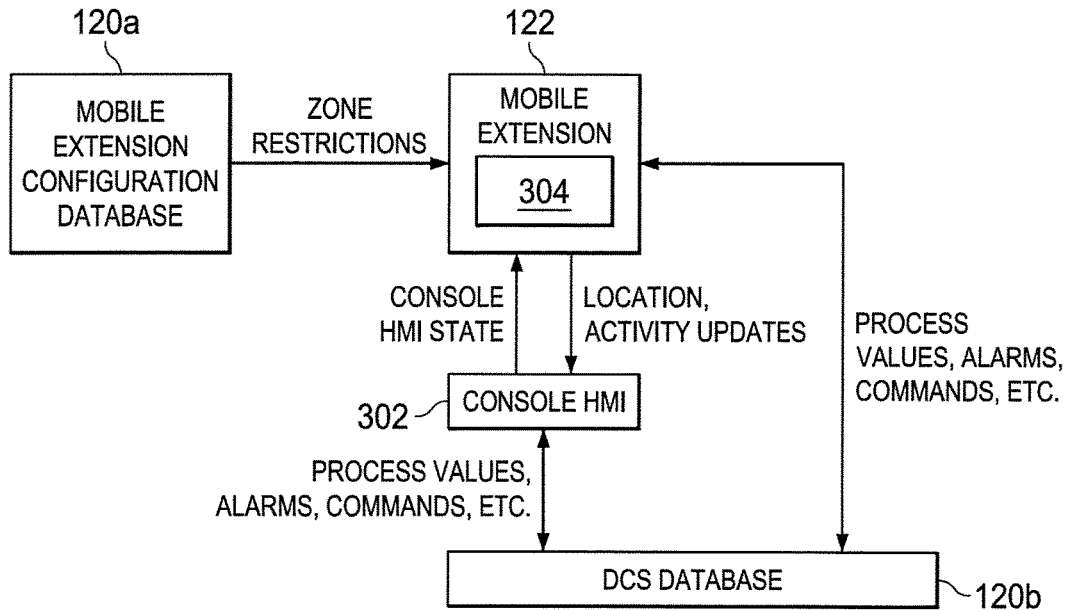

FIGS. 2 and 3 illustrate an example operator console 110 with a mobile extension 122 according to this disclosure. As shown in FIG. 2, the operator console 110 is positioned on a desk 202. The desk 202 supports components of the operator console 110 and could be used to hold or retain electronics under the operator console 110.

The operator console 110 includes one or more graphical displays 204a-204b placed on, mounted to, or otherwise associated with the desk 202. The graphical displays 204a-204b can be used to present various information to an operator. For instance, the graphical displays 204a-204b could be used to display a graphical user interface (GUI) that includes diagrams of an industrial process being controlled and information associated with the current state of the industrial process being controlled. The GUI could also be used to receive information from an operator. Each graphical display 204a-204b includes any suitable display device, such as a liquid crystal display (LCD) or light emitting diode (LED) display. In this example, there are two graphical displays 204a-204b adjacent to and angled with respect to one another. However, an operator console 110 could include any number of graphical displays in any suitable arrangement.

The operator console 110 in this example also includes an additional display 206. The additional display 206 here is placed on the desk 202 and can be positioned at an angle. The additional display 206 could represent a touchscreen that can be used to interact with the GUI in the graphical displays 204a-204h and to control the content on the graphical displays 204a-204b. The additional display 206 could also display additional information not presented on the graphical displays 204a-204b. The additional display 206 includes any suitable display device, such as an LCD or LED display or touchscreen. Note, however, that the use of the additional display 206 is optional and that other input devices (such as a keyboard) could be used.

The operator console 110 further includes an ambient display 208, which in this example is positioned at the top of the graphical displays 204a-204b. The ambient display 208 can output light having different characteristic(s) to identify the current status of an industrial process (or portion thereof) being monitored or controlled using the operator console 110. For example, the ambient display 208 could output green light or no light when the current status of an industrial process or portion thereof is normal. The ambient display 208 could output yellow light when the current status of an industrial process or portion thereof indicates that a warning has been issued. The ambient display 208 could output red light when the current status of an industrial process or portion thereof indicates that an alarm has been issued. Note that other or additional characteristics of the ambient light can also be controlled, such as the intensity of light or the speed of transitions in the light. The ambient display 208 here represents an edge-lit glass segment or other clear segment, where one or more edges of the segment can be illuminated using an LED strip or other light source. Note, however, that the use of the ambient display 208 is optional.

The mobile extension 122 is shown here as residing on the desk 202 and can be placed within a docking station 210. The mobile extension 122 can be used, for example, to support interactions between an operator and GUIs presented in the displays 204a-204b, 206. For instance, the mobile extension 122 could include a touchscreen that can be used to control the content on the displays 204a-204b, 206 and to interact with the GUIs presented in the displays 204a-204b, 206. The mobile extension 122 could also receive and display information to an operator (such as current process variable values or process states) and receive input from the operator (such as variable setpoints and alarm acknowledgements) when the operator moves the mobile extension 122 away from the operator console 110.

The docking station 210 can be used to recharge an internal power supply of the mobile extension 122. The docking station 210 could also be used to support data exchange between the operator console 110 and the mobile extension 122. For example, as noted above, the current operator's login credentials and view state of the operator console 110 (which defines what is being viewed on the graphical displays 204a-204b) could be shared with the mobile extension 122. Note, however, that such data exchanges could also occur wirelessly, such as via the transceiver 124 of the operator console 110.

As shown in FIG. 3, the mobile extension 122 can interact with one or more databases, such as a mobile extension configuration database 120a and a DCS database 120b. The mobile extension 122 also interacts with one or more console HMIs 302.

The console HMIs 302 represent user interfaces provided by the operator console 110 using the graphical displays 120a-120b. The console HMIs 302 provide an operator with access to process-related data, such as process variable values, alarms, notifications, and other information. The console HMIs 302 also allow an operator to issue commands to a control system, such as commands changing controller setpoints and acknowledging alarms. An operator console 110 typically includes a number of HMIs 302 that are logically grouped together and that share a number of features, such as scope of responsibility, alarm acknowledgment and silencing behavior, and display management (like cross-screen invocation). This provides an operator with a coherent user experience while also providing an important degree of resilience in case of component failures.

The mobile extension 122 operates using its own console HMI 304 that is optimized for mobile devices. The console HMI 304 continues to participate in other console functions, extending a coherent console user experience to the mobile extension 122. Because the console HMI 304 participates fully in console functionality, activity on the mobile extension 122 can be reflected in the HMIs 302 supported by the operator console 110. This can, for example, provide cues to other operators that the operator console 110 is in use by a mobile operator, possibly limiting the functionality provided by the HMIs 302.

In the example shown in FIG. 3, the mobile extension 122 can receive console HMI state information and provide location and activity update information. The console HMI state information includes login credentials, view states, or other state information of the operator console 110. This allows an operator to sign onto the operator console 110 and then use the mobile extension 122 without separately signing into the mobile extension 122. The location information could be used to limit the functions that the mobile extension 122 can perform based on the location of the mobile extension 122 or the distance of the mobile extension 122 from the operator console 110. The activity update information can indicate whether the mobile extension 122 is currently being used by an operator and can optionally include information associated with the functions invoked on the mobile extension 122. The location and activity update information could be used by the operator console 110 to generate an indication on the operator console 110 that the mobile extension 122 is currently in use.

The mobile device configuration database 120a represents a repository of information that defines what functionality is available on the mobile extension 122 in different physical regions. This information is referred to as zone restrictions. Consider FIG. 4, which illustrates an example geofencing of a mobile extension 122 for an operator console 110 according to this disclosure. In this example, the functions available at the mobile extension 122 vary depending on the zone in which the mobile extension 122 is located. In some embodiments, the mobile device configuration database 120a could define zone restrictions as follows. The mobile extension 122 may be used to view process data, acknowledge alarms, and change controller setpoints while in a control room 112 (Zone 1). The mobile extension 122 may be used to view process data and acknowledge alarms in a meeting room or kitchen adjacent to the control room 112 (Zone 2). In other areas, the mobile extension 122 may be restricted to only viewing process data and optionally alarms (Zone 3).

The DCS database 120b receives and logs process-related data, such as process variable values, alarms generated by a control system, and commands received from operators. The DCS database 120b can also provide information to or receive information from the console HMIs 302 and the mobile extension 122. For example, the DCS database 120b could provide the process variable values and alarms to the HMIs 302 and the mobile extension 122 for display. The DCS database 120b could also receive commands from the HMIs 302 and the mobile extension 122.

Figure 4:
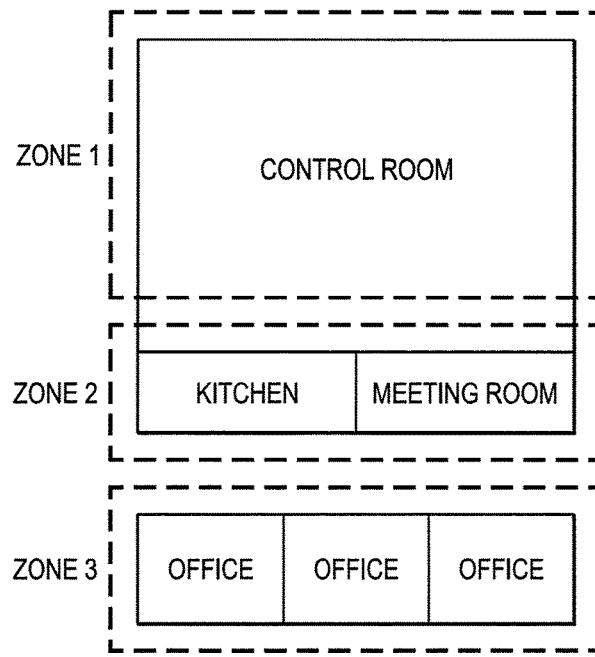
FIG. 4 illustrates an example geofencing of a mobile extension for an operator console according to this disclosure.

Although FIGS. 2 and 3 illustrate one example of an operator console 110 with a mobile extension 122, various changes may be made to FIGS. 2 and 3. For example, the form of the operator console 110 shown in FIG. 2 is for illustration only. Operator consoles, like most computing devices, can come in a wide variety of configurations, and FIG. 2 does not limit this disclosure to any particular configuration of operator console. Also, various components in FIG. 3 could be combined, further subdivided, or omitted and additional components could be added according to particular needs. For instance, the databases 120a-120b could be combined into a single database or subdivided into more than two databases. Although FIG. 4 illustrates one example of geofencing of a mobile extension 112 for an operator console 110, various changes may be made to FIG. 4. For example, the number of zones and the specific rooms in each zone are for illustration only. In general, a system could support any number of zones, where each zone includes any number(s) and type(s) of area(s). Also, the functionality associated with each zone described above represents one example division of functions. Each zone could be associated with any suitable functionality on the mobile extension 122, and the functionality for each zone could be configurable.

Figure 5:
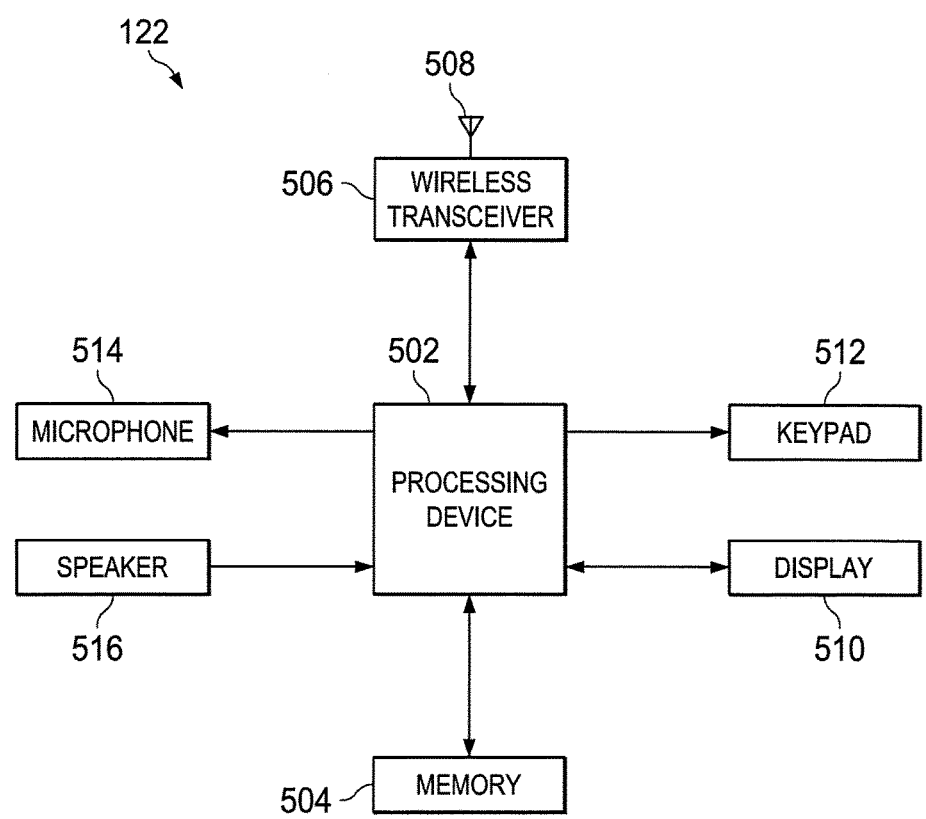
FIG. 5 illustrates an example mobile extension for an operator console according to this disclosure.

FIG. 5 illustrates an example mobile extension 122 for an operator console 110 according to this disclosure. As shown in FIG. 5, the mobile extension 122 includes at least one processing device 502, which controls the overall operation of the mobile extension 122. For example, the processing device 502 may control interactions with an operator console 110 to exchange state information, receive process-related data for display, and receive operator commands for altering an industrial process. The processing device 502 includes any suitable structure for controlling the operation of a mobile extension. As particular examples, the processing device 502 could include one or more processors, microprocessors, microcontrollers, field programmable gate arrays, application specific integrated circuits, discrete logic devices, or other processing or control devices.

At least one memory 504 stores any of a wide variety of information used, collected, or generated by the mobile extension 122. For example, the memory 504 could store instructions executed by the processing device 502, as well as data transmitted to or received from the operator console 110 and data received from an operator. The memory 504 includes any suitable volatile and/or non-volatile storage and retrieval device or devices.

The mobile extension 122 also includes at least one wireless transceiver 506 coupled to at least one antenna 508. The transceiver(s) 506 and antenna(s) 508 can be used by the mobile extension 122 to communicate wirelessly with other devices or systems. For example, the transceiver(s) 506 and antenna(s) 508 could communicate with the transceiver(s) 124 of an associated operator console 110. The transceiver(s) 506 and antenna(s) 508 could also communicate with WIFI or other access points, routers, relays, switches, or other network infrastructure components. Each transceiver 506 may be coupled to its own antenna 508 or share one or more common antennas 508.

Each transceiver 506 includes any suitable structure for generating signals to be transmitted wirelessly and/or receiving signals received wirelessly. In some embodiments, each transceiver 506 represents a radio frequency (RF) transceiver. Each transceiver 506 could also include a transmitter and a separate receiver. Each antenna 508 includes any suitable structure for transmitting and receiving wireless signals. Each antenna 508 could represent an RF antenna (although any other suitable wireless signals could be used to communicate). Note that multiple transceivers 506 and antennas 508 that use different communication protocols or techniques could be used in the mobile extension 122. For instance, when the mobile extension 122 is implemented using a smartphone, the mobile extension 122 could include the transceiver(s) 506 and antenna(s) 508 needed for cellular communications as well as WIFI, BLUETOOTH, or other local communications.

The mobile extension 122 further includes a display 510. The display 510 represents a structure for presenting text, images, or other data to an operator. In some embodiments, the display 510 could also be used to receive input from an operator, such as when the display 510 represents a touch-sensitive display. The display 510 includes any suitable structure for presenting information, such as an LCD or LED display or touchscreen.

Depending on the implementation, the mobile extension 122 could include various other components, such as a keypad 512, microphone 514, and speaker 516. The keypad 512 could be used to provide user input to the mobile extension 122, such as via a keyboard, numeric keypad, or other collection of buttons or user-selectable controls. The microphone 514 can be used to capture audio information, such as voice communications from an operator. The speaker 516 can be used to generate audio information, such as audible alarms or voice information received from another operator engaging in a voice communication session with the mobile extension 122.

Although FIG. 5 illustrates one example of a mobile extension 122 for an operator console 110, various changes may be made to FIG. 5. For example, various components in FIG. 5 could be combined, subdivided, or omitted and additional components could be added according to particular needs. As a particular example, the processing device 502 could be implemented using a central processing unit (CPU) and a graphics processing unit (GPU).

Figure 6:
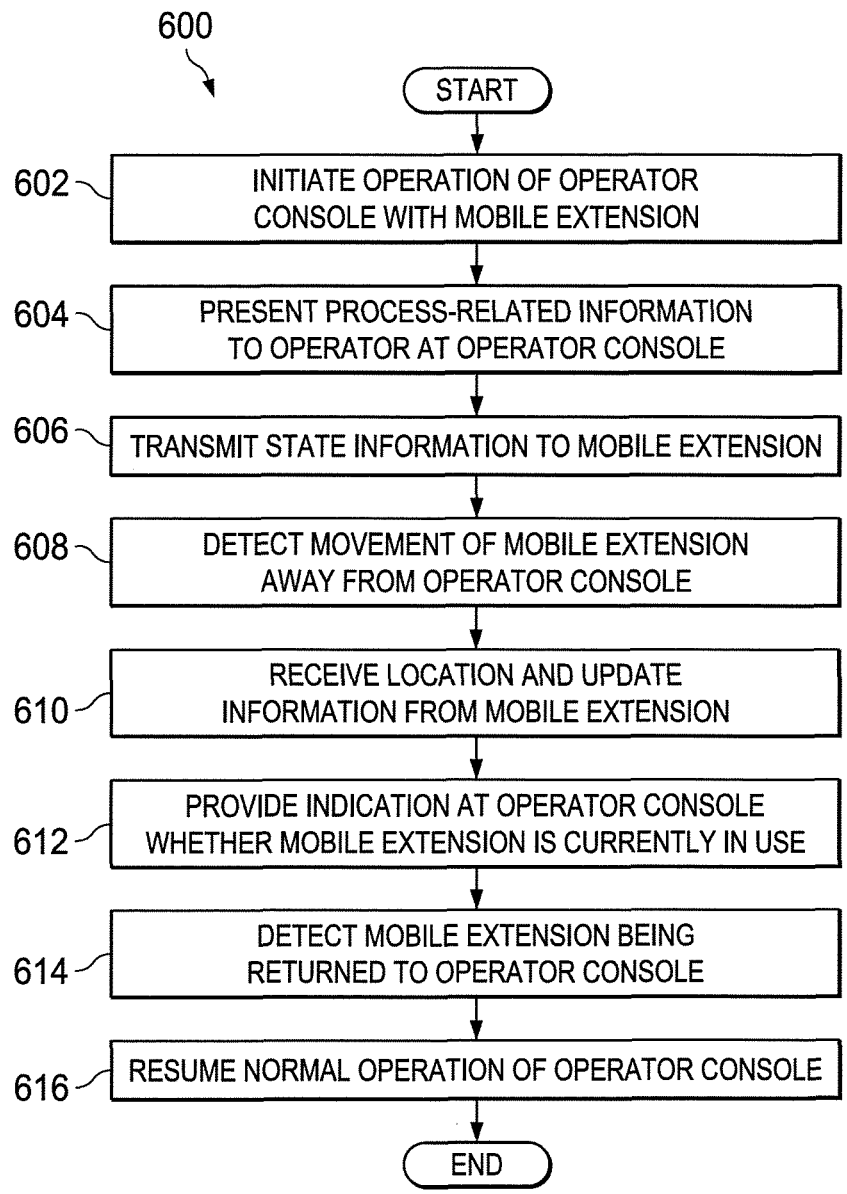
FIGS. 6 and 7 illustrate example methods for using an operator console with a mobile extension according to this disclosure.
Figure 7:
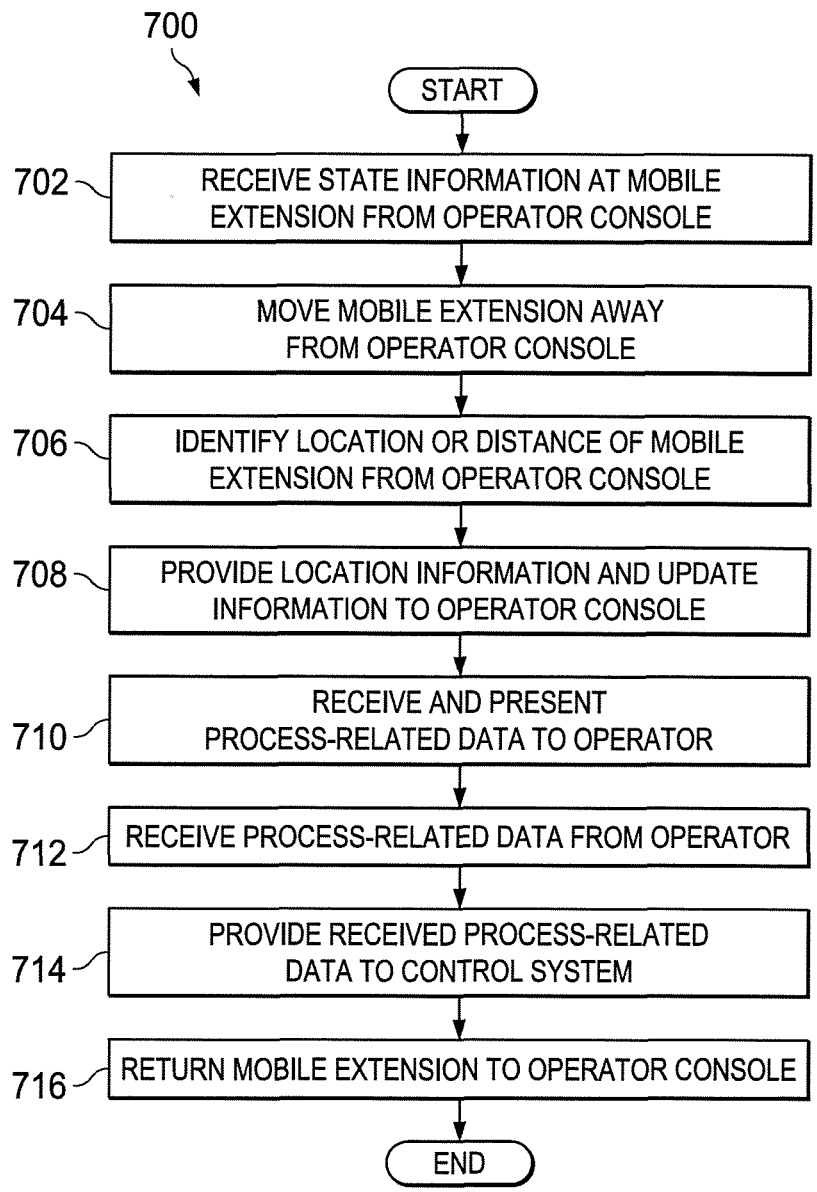

FIGS. 6 and 7 illustrate example methods for using an operator console with a mobile extension according to this disclosure. In particular, FIG. 6 illustrates an example method 600 that could be performed at an operator console 110, and FIG. 7 illustrates an example method 700 that could be performed at a-mobile extension 122. For ease of explanation, the methods 600 and 700 are described with respect to the operator console 110 having the mobile extension 122 as shown in FIGS. 2 through 5. However, the methods 600 and 700 could be used with any other suitable operator console and mobile extension.

As shown in FIG. 6, operation of an operator console with a mobile extension is initiated at step 602. This could include, for example, the processing device 114 of the operator console 110 booting up and performing various initial actions, such as establishing communications with external control system components (like the DCS database 120b). This could also include the processing device 114 receiving and verifying login credentials of an operator logging onto the operation console 110.

The operator console presents process-related information to the operator at step 604. This could include, for example, the processing device 114 retrieving process variable values, alarms, and other data from the DCS database 120b and presenting the information on the graphical displays 204a-204b. As part of this process, the operator console 110 could invoke various HMIs 302 and arrange the HMIs 302 on the displays 204a-204b.

During operation of the operator console, state information is transmitted to the mobile extension at step 606. This could include, for example, the processing device 114 transmitting the login credentials of the operator and the operator's current scope of responsibility to the mobile extension 122. This could also include the processing device 114 keeping the mobile extension 122 updated on the current view states of HMIs 302 displayed by the operator console 110.

At some point, the operator console detects movement of the mobile extension away from the operator console at step 608. Any suitable technique could be used by the operator console 110 or the mobile extension 122 to detect movement away from the operator console. For example, the processing device 114 could detect removal of the mobile extension 122 from the docking station 210. The processing device 114 could also receive information from the mobile extension 122 indicating that the mobile extension 122 has moved away from the operator console 110. The indication from the mobile extension 122 could have any suitable form. For instance, the indication could represent an absolute location of the mobile extension 122 or a distance of the mobile extension 122 from the operator console 110. The indication could also represent an indication whether the mobile extension 122 is receiving beacon signals from the operator console 110 or a receive signal strength of wireless signals (such as the beacon signals) measured at the mobile extension 122.

The operator console receives location and update information from the mobile extension at step 610. This could include, for example, the processing device 114 receiving location information and activity information defining how the operator is using the mobile extension 122. For instance, the activity information could define the process-related information being provided to the mobile extension 122 (such as process variable values and alarms) and the process-related information being received from the mobile extension 122 (such as process variable setpoints and alarm acknowledgements).

The operator console provides an indication at the operator console whether the mobile extension is currently in use at step 612. This could include, for example, the processing device 114 using the activity information from the mobile extension 122 to determine whether the mobile extension 122 is currently in use. This could also include the processing device 114 providing an indication on a graphical display 204a-204b whether a remote operator is currently using the mobile extension 122. During periods of use of the mobile extension 122, this step could include limiting the types of commands that can be invoked by a local user at the operator console 110.

The operator console can eventually detect that the mobile extension is returned to the operator console at step 614. Once again, any suitable technique could be used by the operator console 110 or the mobile extension 122 to detect a return to the operator console. For example, the processing device 114 could detect insertion of the mobile extension 122 into the docking station 210 or could receive information from the mobile extension 122. In response, the operator console resumes normal operation at step 616. This could include, for example, the processing device 114 presenting the HMIs 302 on the graphical displays 204a-204b. Note, however, that the content and arrangement of the HMIs 302 and even the specific HMIs 302 being presented can be updated based on the operator actions that previously occurred using the mobile extension 122.

As shown in FIG. 7, state information is received at a mobile extension from an operator console at step 702. This could include, for example, the processing device 502 of the mobile extension 122 receiving the login credentials of an operator and the operator's current scope of responsibility. This could also include the processing device 502 receiving updates on the current view states of HMIs 302 displayed by the operator console 110.

At some point, the mobile extension moves away from the operator console at step 704. This could include, for example, the processing device 502 detecting removal of the mobile extension 122 from the docking station 210. This could also include the processing device 502 identifying a change in its position. Example techniques could be based on whether the mobile extension 122 receives beacon signals from the operator console 110 or based on a receive signal strength associated with wireless signals (such as the beacon signals) measured at the mobile extension 122.

The mobile extension identifies its location or distance from the operator console at step 706. The mobile extension provides location information and update information to the operator console at step 708. This could include, for example, the processing device 502 sending location information identifying the location of the mobile extension 122 or the distance of the mobile extension 122 from the operator console 110. This could also include the processing device 502 sending information identifying whether the mobile extension 122 is actively being used by an operator and optionally what that activity is.

Process-related information is received and presented to an operator at step 710. This could include, for example, the processing device 502 receiving and presenting process variable values, alarms, and other process-related data on the display 510. Note that this step can depend on the location information identified earlier. For instance, the types of data that can be presented to an operator could vary depending on the zone in which the mobile extension 122 is located.

Process-related data is received from an operator at step 712 and provided to a control system at step 714. This could include, for example, the processing device 502 receiving process variable setpoints, acknowledgements of alarms, or other process-related data from the operator. This could also include the processing device 502 initiating transmission of this information to the DCS database 120b directly or indirectly, such as via the operator console 110. Note that this step can also depend on the location information identified earlier. For instance, the types of data that could be received from an operator and sent to the control system could vary depending on the zone in which the mobile extension 122 is located.

At some point, the mobile extension can be returned to the operator console at step 716. This could include, for example, the operator returning the mobile extension 122 to the docking station 210. At that point, the method 700 could be repeated.

In this way, an operator can seamlessly transition between using an operator console 110 and using a mobile extension 122. Various other actions could also be performed using the mobile extension 122. For instance, the operator console 110 could support a mechanism for proximity detection to detect when the mobile extension 122 is approaching the operator console 110 (the same mechanism could be used to detect movement of the mobile extension 122 away from the operator console 110 in the methods 600 and 700). The detection of the mobile extension 122 approaching the operator console 110 could be used to trigger various actions at the operator console 110 or the mobile extension 122. For instance, if the mobile extension 122 is uniquely associated with an operator, the operator console 110 could automatically retrieve information from the mobile extension 122 and log the operator into the operator console 110. As another example, the operator console 110 could update the HMIs 302 that the operator console 110 is displaying based on the HMIs that the operator opened, closed, or modified using the mobile extension 122. Any other or additional functions could occur based on the proximity detection.

Although FIGS. 6 and 7 illustrate examples of methods 600 and 700 for using an operator console 110 with a mobile extension 122, various changes may be made to FIGS. 6 and 7. For example, while shown as a series of steps, various steps in each figure could overlap, occur in parallel, occur in a different order, or occur any number of times. Also, various steps shown in one figure and described as being performed by one device (the operator console 110 or the mobile extension 122) could be performed by the other device (the mobile extension 122 or the operator console 110). For instance, either the mobile extension 122 or the operator console 110 could use the location of the mobile extension 122 or the distance of the mobile extension 122 from the operator console 110 to control what options are available to an operator using the mobile extension 122.

In some embodiments, various functions described above (such as functions performed by an operator console or mobile extension) are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
presenting first process-related information to an operator at a mobile extension, the mobile extension associated with an operator console that displays information associated with an industrial process and with a control system associated with the industrial process;
receiving second process-related information from the operator at the mobile extension for the control system; and
receiving state information from the operator console at the mobile extension, the state information associated with operations of the operator console;
wherein at least part of the first process-related information that is presented to the operator or at least part of the second process-related information that is received from the operator is based on a location of the mobile extension; and
wherein the location of the mobile extension is associated with one of multiple zones, each zone associated with a different operator permission level for read and write access to process parameters of the industrial process.

2. The method of claim 1, wherein the state information comprises login credentials of the operator and one or more current views of one or more Human Machine Interfaces (HMIs) at the operator console.

3. The method of claim 2, wherein the mobile extension is used by the operator without the operator providing the login credentials to the mobile extension.

4. The method of claim 1, further comprising:
providing an indication at the operator console that the mobile extension is currently in use by the operator.

5. The method of claim 1, wherein the at least part of the first process-related information that is presented to the operator or the at least part of the second process-related information that is received from the operator is based on the zone in which the mobile extension is located.

6. The method of claim 5, wherein:
when the mobile extension is located within a first zone, the mobile extension allows the operator to view and acknowledge alarms and provides read/write access to the process parameters;
when the mobile extension is located within a second zone, the mobile extension allows the operator to view and acknowledge alarms and provides read access but not write access to the process parameters; and
when the mobile extension is located within a third zone, the mobile extension allows the operator to view but not acknowledge alarms and provides read access but not write access to the process parameters.

7. The method of claim 1, wherein the location of the mobile extension is defined as a distance of the mobile extension from the operator console.

8. An apparatus comprising:
a display configured to present first process-related information to an operator, the apparatus associated with an operator console that is configured to display information associated with an industrial process and with a control system associated with the industrial process; and
at least one processing device configured to control presentation of the first process-related information on the display and to receive second process-related information from the operator for the control system;
wherein the at least one processing device is further configured to receive state information from the operator console, the state information associated with operations of the operator console;
wherein the at least one processing device is further configured to base at least part of the first process-related information that is presented to the operator or at least part of the second process-related information that is received from the operator on a location of the apparatus; and
wherein the location of the apparatus is associated with one of multiple zones, each zone associated with a different operator permission level for read and write access to process parameters of the industrial process.

9. The apparatus of claim 8, wherein the state information comprises login credentials of the operator and one or more current views of one or more Human Machine Interfaces (HMIs) at the operator console.

10. The apparatus of claim 9, wherein the apparatus is configured to be used by the operator without the operator providing the login credentials to the apparatus.

11. The apparatus of claim 8, wherein the at least one processing device is configured to base the at least part of the first process-related information that is presented to the operator or the at least part of the second process-related information that is received from the operator on the zone in which the apparatus is located.

12. The apparatus of claim 8, wherein the at least one processing device is configured to identify the location of the apparatus as a distance of the apparatus from the operator console.

13. The apparatus of claim 8, wherein the at least one processing device is further configured to initiate transmission of activity update information to the operator console, the activity update information identifying actions taken by the operator using the apparatus.

14. The apparatus of claim 8, wherein the at least one processing device is further configured to support operator interaction with one or more Human Machine Interfaces (HMIs) at the operator console.

15. A system comprising:
an operator console comprising at least one graphical display configured to present information associated with an industrial process and with a control system associated with the industrial process; and
a mobile extension associated with the operator console, the mobile extension configured to present first process-related information to an operator and receive second process-related information from the operator for the control system;
wherein the operator console is further configured to provide state information to the mobile extension, the state information associated with operations of the operator console;
wherein the mobile extension is further configured to base at least part of the first process-related information that is presented to the operator or at least part of the second process-related information that is received from the operator on a location of the mobile extension; and
wherein the location of the mobile extension is associated with one of multiple zones, each zone associated with a different operator permission level for read and write access to process parameters of the industrial process.

16. The system of claim 15, wherein the operator console is further configured to provide an indication that the mobile extension is currently in use by the operator.

17. The system of claim 15, wherein the mobile extension is configured to base the at least part of the first process-related information that is presented to the operator or the at least part of the second process-related information that is received from the operator on the zone in which the mobile extension is located.

18. The system of claim 15, wherein the operator console is further configured, upon detecting that the mobile extension is approaching or at the operator console, to update one or more Human Machine Interfaces (HMIs) presented at the operator console based on one or more HMIs that the operator opened, modified, or closed using the mobile extension.

19. The system of claim 15, wherein the state information comprises login credentials of the operator and one or more current views of one or more Human Machine Interfaces (HMIs) at the operator console.

20. The system of claim 19, wherein the mobile extension is configured to be used by the operator without the operator providing the login credentials to the mobile extension.

* * * * *